United States Patent [19]

Mayer et al.

[11] 4,168,722

[45] Sep. 25, 1979

[54] FEATHER VALVE

[75] Inventors: Thomas E. Mayer, Tonawanda, N.Y.; A. Hunt Davis, Houston, Tex.; Ronald W. Beyer, Boston, NY

[73] Assignee: Worthington Compressors, Inc., Holyoke, Mass.

[21] Appl. No.: 851,136

[22] Filed: Nov. 14, 1977

[51] Int. Cl.$^2$ .............................................. F16K 15/14
[52] U.S. Cl. ........................... 137/516.11; 137/512.1; 137/856
[58] Field of Search ..................... 137/512.1, 855, 856, 137/516.11, 516.15

[56] References Cited

U.S. PATENT DOCUMENTS

| 1,754,747 | 4/1930 | Feldbush | 137/512.1 |
| 3,556,136 | 1/1971 | White | 137/512.1 |
| 3,939,867 | 2/1976 | Lunduik et al. | 137/856 X |

*Primary Examiner*—William R. Cline
*Attorney, Agent, or Firm*—Fishman and Van Kirk

[57] ABSTRACT

A feather valve is presented having shock absorbing strips in the guard section to absorb impact loads and dampen vibration of the feather strips.

10 Claims, 2 Drawing Figures

FEATHER VALVE

BACKGROUND OF THE INVENTION:

(1) Field of the Invention

The present invention relates to exercise of control over the flow of fluids and particularly to achieving unidirectional flow of gas into a compressor and discharge of gas from a compressor. More specifically, this invention is directed to flow control devices and particularly to one-way flow valves. Accordingly, the general objects of the present invention are to provide novel and improved methods and apparatus of such character.

(2) Description of the Prior Art

The present invention relates to one-way flow or check valves of the type known in the art as "reed" or "feather" valves. Valves of this type have long been known and are exemplified by U.S. Pat. Nos. 1,534,260, 1,754,747 and 2,092,088. These valves, which will hereinafter be referred to as "feather" valves, are used in both the inlet and discharge lines of reciprocating type compressors. Such feather valves are critical to proper operation of reciprocating type compressors and a typical compressor may employ from two to sixteen valves per cylinder. Accordingly, in a large compressor installation, there may be in excess of one hundred feather valves and the failure of any one valve (i.e. one feather in one valve) will result in shutdown of the compressor.

To briefly describe a typical prior art feather valve, the device includes a valve seat defining member consisting of a flat plate which has a plurality of parallelly oriented slots or ports extending therethrough. A member known as a guard faces the valve seat and is also provided with parallel through slots or ports; the slots in the guard being offset in staggered relation with respect to the slots in the seat. The guard also includes, between the through slots, curved recesses. Flexible strips or feathers are sandwiched between the seat and guard and are constrained so as to be in alignment with the slots in the seat. The strips, when in the seated position, completely cover the slots that form the air passages through the seat whereby the valve will be in the closed condition. The strips are restrained to prevent uncovering of these slots or ports except by flexure into the curved recesses, also known as profiles, in the guard. Considering operation of a feather valve on the suction side of a compressor, the valve is in the air intake with the valve seat on the upstream side and the valve guard downstream. On the suction stroke negative pressure in the cylinder results in air being drawn into the cylinder through the valves with the strips flexing into the profiles in the guard and thus permitting flow of air through the offset slots in the seat and guard. On the compression stroke the strips or feathers of the inlet valve are forced flat against the surface of the seat thereby sealing the slots and permitting the air which has been drawn in to be compressed. On the discharge side of the compressor the valves are positioned so that the discharge pressure flexes the strips to permit flow through the valves.

The operating environment of a feather valve of the type briefly discussed above may, as noted, be in the inlet or discharge line of a reciprocating compressor. In the case of high speed compressor; i.e., those which operate at speeds in excess of 800 rpm; a typical prior art feather valve has had a service life of less than one hundred hours. This comparatively short service life results from fatigue of the flexing strips which function as the moving valve members. In use the strips are subjected to stresses caused by bending and impact. The impact of the strip on the guard when the valve opens, and the vibration induced in the moving element following the impact, are important causes of fatigue and subsequent valve failure. Other causes of valve failure are thought to be corrosion fatigue and thermal-shock.

Attempts to overcome the above briefly discussed problems, and thereby provide feather valves having an increased service life, have concentrated upon the judicious selection of materials, enhancement of the structural integrity of the strips through resort to use of double flexing strips or strips of increased thickness and to coating relatively moving contacting surfaces with materials having a low coefficient of friction so as to minimize any increase in temperature of the parts resulting from friction. These prior art techniques have not resulted in significant improvements in valve life expectancy.

SUMMARY OF THE INVENTION

The present invention overcomes the above-discussed and other deficiences and disadvantages of the prior art by providing a novel and improved valve of the feather or reed type particularly well suited for use in the inlet and discharge lines of reciprocating compressors. Valves in accordance with the present invention are characterized by shock absorbing impact surfaces which are contacted by the flexible strips when the valves are opened. The shock absorbing impact surfaces may be bonded or otherwise fastened to the profiles of the guards, or may be retained in the same manner as the flexible strips.

In accordance with a preferred embodiment of the invention the means for absorbing shock resulting from impact of the flexible strips against the guard member comprises a soft, high hysteresis lining on the profiles of the guard. This lining, also in accordance with the preferred embodiment, consists of a strip of plastic material retained between the sealing strip and the guard; the plastic material being selected to have the requisite strength and resiliency at the operating temperatures which may be encountered.

BRIEF DESCRIPTION OF THE DRAWING

The present invention may be better understood and its numerous objects and advantages will become apparent to those skilled in the art by reference to the accompanying drawing wherein like reference numerals refer to like elements in the two figures and in which.

DESCRIPTION OF THE PREFERRED EMBODIMENT

Figure 1:
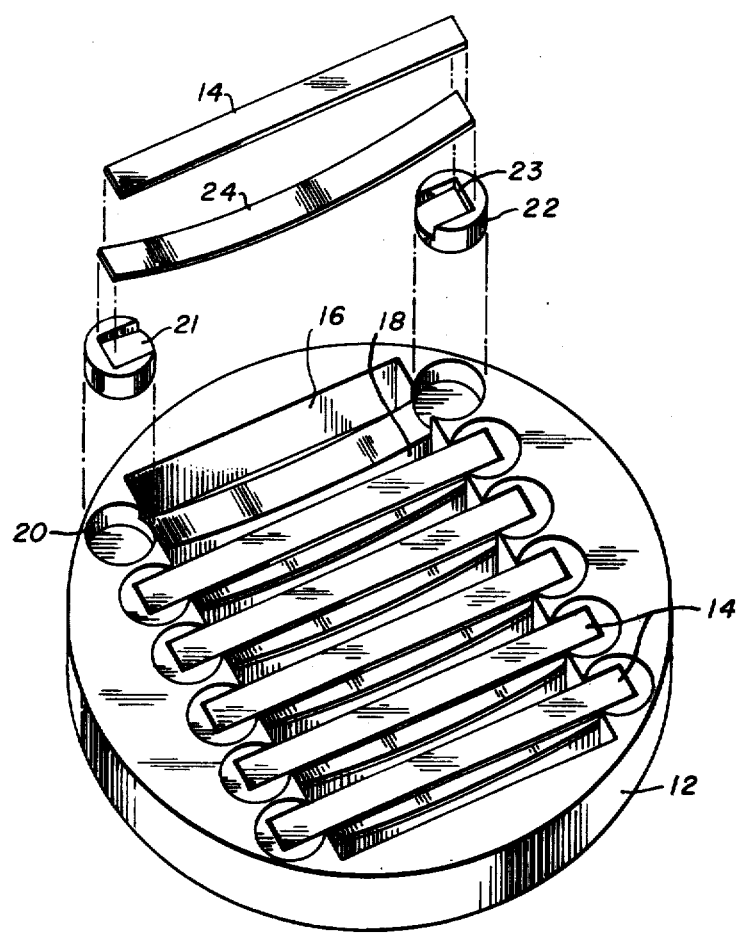
FIG. 1 is an exploded perspective view, with the seat removed, of a multi-element feather valve assembly in accordance with a preferred embodiment of the present invention.
Figure 2:
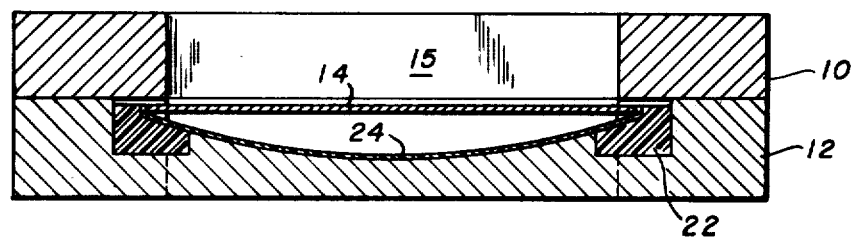
FIG. 2 is a cross-sectional side elevation view through one of the feather elements of the assembly of FIG. 1, FIG. 2 showing the valve in the assembled form and with the valve seat included.

Referring jointly to FIGS. 1 and 2, a feather valve in accordance with the present invention includes a valve seat 10, a guard 12 and flexible strips or feathers 14 which perform the valving function. The seat 10 and guard 12 will typically be iron castings machined to the requisite dimensions. The valve seat 10 is a flat, ground plate which is provided with a plurality of rectangular slots or ports 15. These slots will typically be formed by milling, will pass entirely through the seat and will be oriented parallel with respect to one another.

The guard 12 will also be a flat, ground plate. Guard 12 will include rectangular slots or ports which are typically of the same size and shape as the slots in the valve seat 10. The slots in guard 12 will be offset in staggered relation with respect to the slots in seat 10 and will, of course, pass through guard 12 whereby, with the valve in the open condition, gas may flow through the device via the offset slots. One of the through slots in guard 12 may be clearly seen at 16 in FIG. 1. The guard 12 also includes a plurality of ribs, such as ribs 18, located between the slots 16. The inwardly facing surfaces of ribs 18, i.e., those surfaces of the ribs which face the seat with the valve assembled, are curved to define recesses or profiles into which the strips 14 deflect. At the opposite ends of each of ribs 18, the guard 12 is provided with cylindrical recesses such as recess 20.

Pedestals or nubs 22 are received in each of the recesses 20 of guard 12. The nubs 22 are preferably comprised of a material having a low coefficient of friction such as polytetrofluoroethylene. As may best be seen from FIG. 2 (where one set of nubs and one feather are shown in an exploded view), the nubs 22 are shaped such that the portions 21 of the upper surfaces thereof define curved continuations of the upper curved surfaces of the ribs 18. At the end of these curved surface portions, the nubs 22 are provided with vertical shoulders 23 which contact the ends of the strips 14. The strips 14 are thus supported, at opposite ends, on a material having a low coefficient of friction. Lateral movement of the strips 14 is precluded by establishing lines of contact between the sides thereof and the edges of the nubs, 22, which are confined in guard 12.

The valve strips 14 will typically be comprised of a metal having sufficient resiliency and strength. Type 410 stainless steel has been found to be particularly well suited for use as the moving valve members of the present invention. The strips 14 are customarily equal in width to the ribs 18 of guard 12 and the strips and ribs are of greater width then the slots 15 in the valve seat 10. Thus, with the strips 14 in the position shown in FIG. 2, wherein they will be resiliently self-loaded against the face of valve seat 10, the slots 15 in the valve seat will be completely covered or overlapped by strips 14 and the valve will be in the closed condition.

The valve of the present invention also includes strips 24 of a soft, high hysteresis lining material confined to the tops of the ribs 18 of guard 12. Strips 24 absorb the shock impact of the valve strips 14 and are formed from a material which retains its strength and resiliency at temperatures which may exceed 350° F. Particularly good results have been obtained employing a polyimide such as the material available from E. I. du Pont de Nemours & Co. under the trade name Vespel SPI. Strips 24 are preferably mechanically affixed to the guard 12 but they may be extended in length so as to be captured in the same manner as strips 14 and thus not be secured to the ribs 18 of guard 12. Alternatively, the strips may be adhesively bonded to the guard. As the feathers 14 of the valve are cycled from the closed to open position, the impact of the moving feathers on the profiles of ribs 18 is absorbed by the strips 24, and the strips 24 also damp out the vibration encountered in the prior art.

Employing the present invention, the life of feather valves installed in the inlet and discharge lines of a reciprocating compressor rated at 200 horsepower and operating at 800–900 rpm has been extended from less than 100 hours to in excess of 6000 hours, representing over 300,000,000 cyclings of each valve and each feather strip, without failure.

While a preferred embodiment has been shown and described, various modifications and substitutions may be made thereto without departing from the spirit and scope of the invention. Accordingly, it will be understood that the present invention has been described by way of illustration and not limitation.

What is claimed is:

1. A valve assembly comprising:
   valve seat means, said valve seat means including a flat seating surface and having at least one elongated port;
   guard means, said guard means being provided with a plurality of ports, the ports in said guard means being offset with respect to said port in said valve seat means, the ports in said guard means being separated by rib means, said rib means being generally aligned with the port in said valve seat means and having smoothly curved concave surface means facing said valve seat means;
   flexible strip means having a first end portion and a second end portion, said flexible strip means being positioned between said valve seat means and said guard means, said strip means being aligned with said port in said valve seat means and said rib means in said guard means, said strip means having a width which exceeds that of the port in said valve seat means, said strip means normally being flat and contacting the seating surface of said valve seat means whereby said strip means covers said port in said valve seat means to prevent flow through the valve when said flexible strip means is in an undeflected condition;
   a first strip support means and a second strip support means, said first and second strip support means being located on opposite ends of said rib means and receiving said first and second end portions of the flexible strip means, said first and second strip support means comprising a plastic material having a low coefficient of friction, said first and second end portions of said flexible strip means sliding with respect to the first and second support means to allow for flexure of said flexible strip means and to permit flow through the valve when said flexible strip means is in a deflected condition; and
   shock absorbing strip means extending between the first and second strip support means and positioned between said strip means and said rib means, said shock absorbing strip means comprising a plastic material which absorbs and damps forces resulting from the impact of said strip means on said shock absorbing strip means when the end portions of the strip means slide with respect to the first and second support means and said flexible strip means is deflected to open the valve.

2. The valve assembly of claim 1 wherein:
   said shock absorbing means is a layer of material adhered to said concave surface means of said rib means.

3. The valve assembly of claim 1 wherein said first and second strip support means each include a body having a recess for receiving the end portions of the flexible strip means, said recess defining a shoulder, two edges, and a floor, said shoulder restraining the flexible strips in a direction parallel to the longitudinal axis of the strip, said edges restraining movement of the strips in a direction perpendicular to the longitudinal axis of the strip, and said floor being shaped to define a curved continuation of said smoothly curved concave surface means of said rib means.

4. The valve assembly of claim 3 wherein said guard means further comprises:
   recesses formed in the surface of said guard means which face said seat means, said recesses being located at the opposite ends of each of said rib means, said recesses being shaped to receive said bodies of said first and second flexible strip support means wherein said shock absorbing strip means defines a first end portion and a second end portion and wherein said first and second end portions of the shock absorbing strip means are received by the recesses in the bodies of said first and second flexible strip support means.

5. The valve assembly of claim 4 wherein the edges of the recess of the bodies of the first and second strip support means prevent the flexible strip means from contacting said guard means.

6. A valve assembly comprising:
   valve seat means, said valve seat means including a flat seating surface and having a plurality of elongated ports in a parallel array;
   guard means, said guard means having a plurality of elongated ports in a parallel array, the ports in said guard means being offset with respect to said ports in said valve seat means, said ports in said guard means being separated by ribs, said ribs being generally aligned with said ports in said valve seat means and having smoothly curved concave surfaces facing said valve seat means;
   flexible strips having a first end portion and a second end portion and positioned between said valve seat means and said guard means, each of said strips being aligned with an associated one of said ports in said valve seat means and an associated one of said ribs in said guard means, each of said strips having a width which exceeds that of the associated port in said valve seat means, said strips normally being flat and contacting the seating surface of said valve seat means whereby said strips cover said ports in said valve seat means to prevent flow through the valve when the flexible strips are in an undeflected condition;
   a first strip support means and a second strip support means associated with each rib means, the first and second support means being located on opposite ends of the rib means and receiving the first and second end portions of the flexible strip means, the first and second end portions of the strips sliding with respect to said first and second support means to allow for flexure of said flexible strips to permit flow through the valve when said flexible strips are in a deflected condition; and
   a plurality of shock absorbing strip means associated with each of the rib means, said shock absorbing strip means extending between the first and second strip support means and positioned between each of said flexible strips and each of said rib means, said shock absorbing strip means comprising a plastic material which absorbs and damps forces resulting from the impact of said flexible strips on said shock absorbing strip means when the end portions of the flexible strips slide with respect to the first and second strip support means and said flexible strips are deflected to open the valve.

7. The valve assembly of claim 6 wherein:
   said shock absorbing means is a layer of material adhered to said concave surface of each rib.

8. The valve assembly of claim 6 wherein the first and second strip support means each include a body including a recess for receiving the end portions of the flexible strip means, said recess defining a shoulder, a floor and two edges, said shoulder restraining the flexible strips in a direction parallel to the longitudinal axis of the strip, said edges restraining movement of the strips in a direction perpendicular to the longitudinal axis of the strip, and said floor being shaped to define a curved continuation of said smoothly curved surface means of said rib means.

9. The valve assembly of claim 8 wherein said guard means further comprises:
   recesses formed in the surface of said guard means which faces said seat means, said recesses being located at the opposite ends of each of said rib means, said recesses being shaped to receive said bodies of said first and second flexible strip support means, and wherein said shock absorbing strip means defines a first end portion and a second end portion, and wherein said first and second end portions of the shock absorbing strip means are received by the recesses in the bodies of said first and second flexible strip support means.

10. The valve assembly of claim 9 wherein the edges of the recess of the bodies of the first and second strip support means prevent the flexible strip from contacting said guard means.

* * * * *